F. W. LANCHESTER.
CLUTCH AND CHANGE GEAR MECHANISM.
APPLICATION FILED OCT. 23, 1918.
1,331,714.
Patented Feb. 24, 1920.
2 SHEETS—SHEET 1.
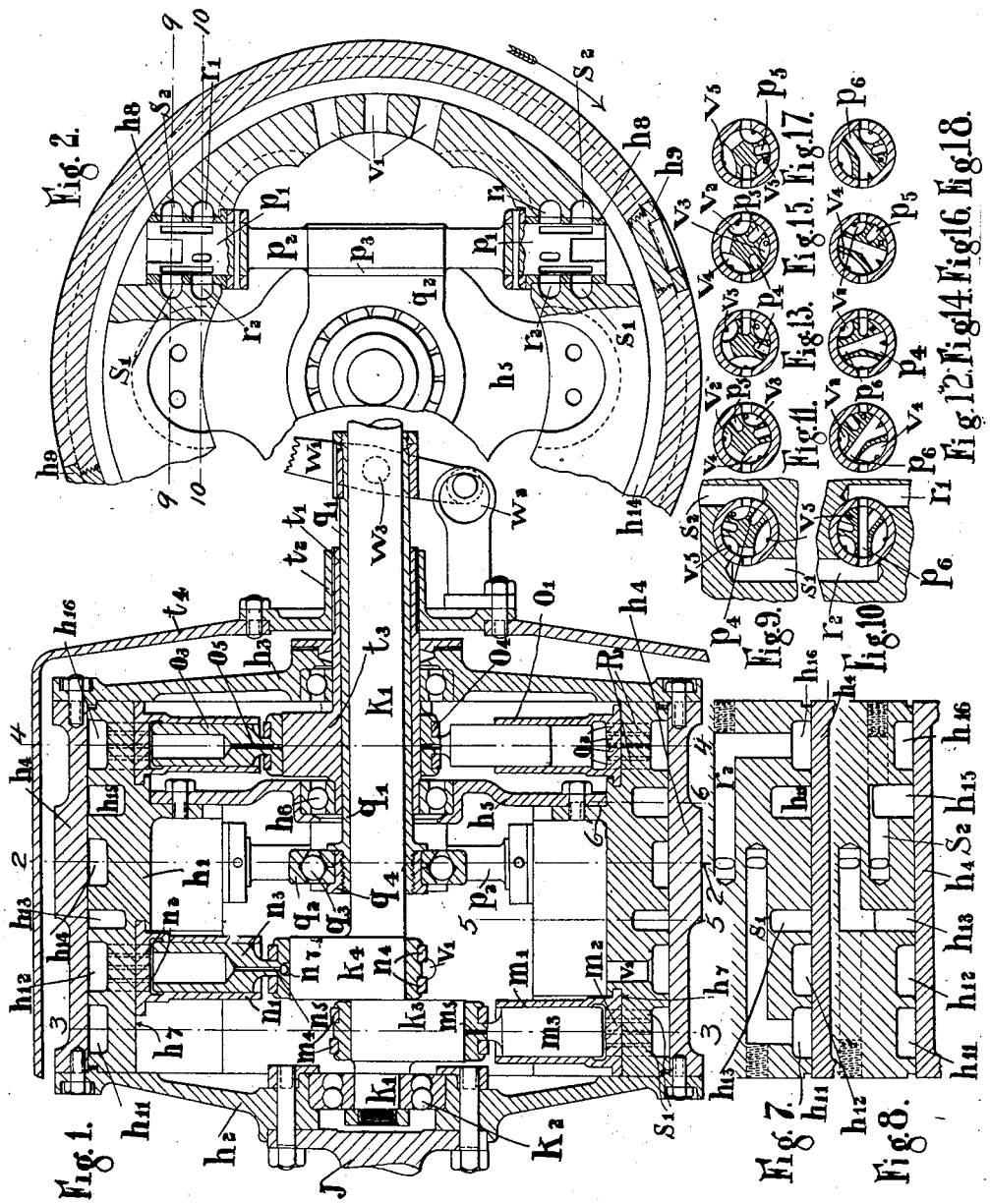
INVENTOR
F.W.Lanchester.
BY H.R.Kerslake
ATTORNEY

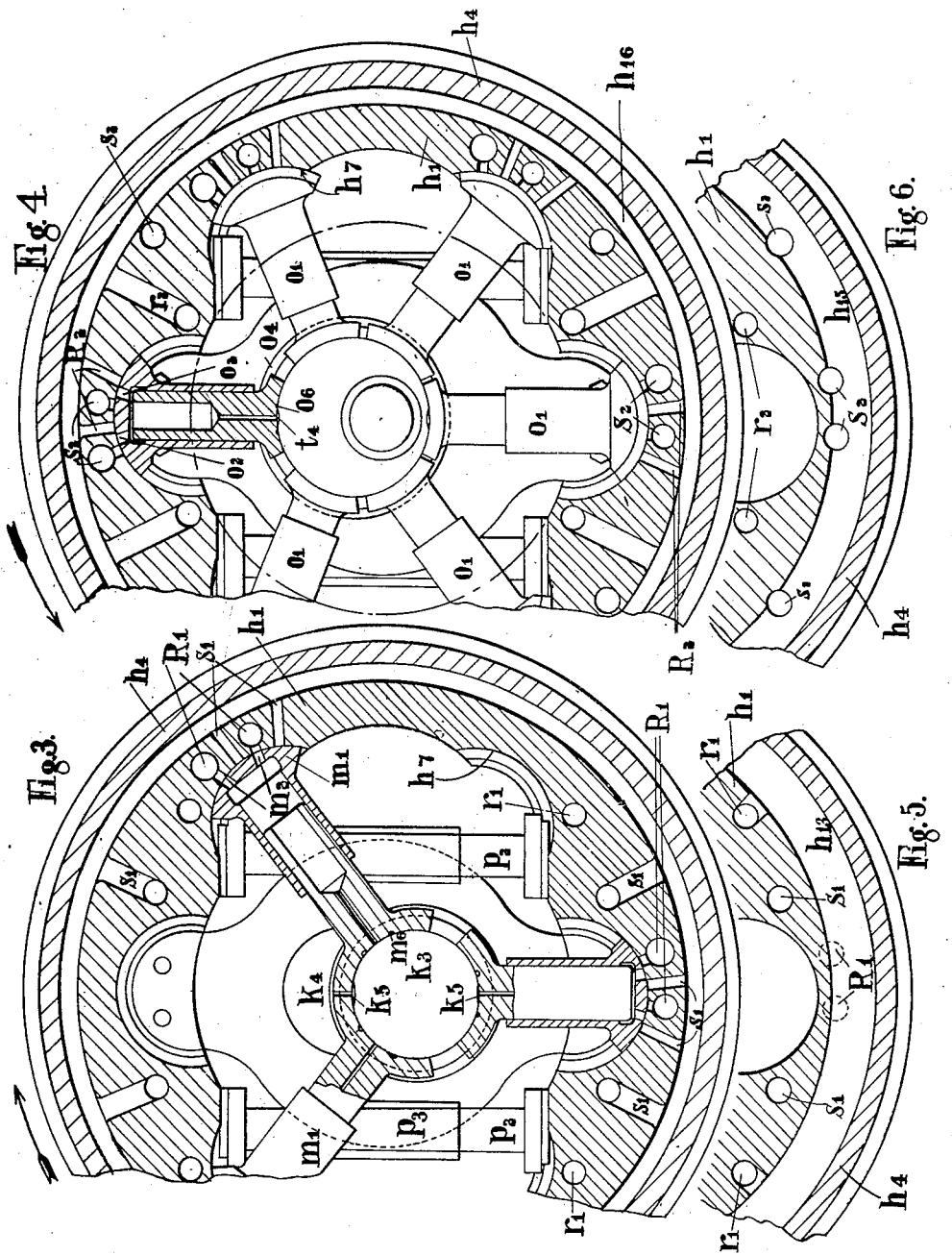

UNITED STATES PATENT OFFICE.

FREDERICK WILLIAM LANCHESTER, OF LONDON, ENGLAND.

CLUTCH AND CHANGE-GEAR MECHANISM.

1,331,714.      Specification of Letters Patent.      Patented Feb. 24, 1920.

Application filed October 23, 1918. Serial No. 259,451.

*To all whom it may concern:*

Be it known that I, FREDERICK WILLIAM LANCHESTER, a subject of the King of Great Britain and Ireland, and residing at 41 Bedford Square, London, W. C. 1., England, have invented certain new and useful Improvements in Clutch and Change-Gear Mechanism, More Especially Applicable to Motor-Vehicles, of which the following is a specification.

The present invention relates to improvements in clutch and change gear mechanism, and is more particularly applicable to motor vehicles.

The present invention consists in brief in clutch and change speed mechanism for the transmission of power comprising an outer or drum element coupled to the driving shaft and carrying two sets of radially disposed hydraulic cylinders, whose pistons or plungers engage respectively with cranks or eccentrics forming part of or keyed to driven and fixed elements respectively, and in means for cross-coupling the two sets of cylinders wholly or partially and in such manner as to bring about the changes of gear required.

The present invention further consists in clutch and change speed mechanism in accordance with the preceding paragraph constructed and operating substantially as described.

The accompanying two sheets of diagrammatic drawings serve to illustrate by way of example an application of the present invention to the transmission system of a motor vehicle in which provision is made for three direct and one reverse ratio.

With reference to these:—

Figure 1 is a longitudinal section of a gear box embodying the present invention.

Fig. 2 is a transverse section through the same on the line 2—2.

Fig. 3 is a transverse section on the line 3—3.

Fig. 4 is a transverse section on the line 4—4.

Figs. 5 and 6 are partial transverse sections on the lines 5—5 and 6—6 respectively.

Figs. 7 and 8 are conventional sections illustrating more completely the valve port connections shown in Figs. 3, 4, 5 and 6.

Figs. 9, 11, 13, 15 and 17 are sections through the control valve in five functionally different positions on the line 9—9 (Fig. 2) and Figs. 10, 12, 14, 16 and 18 are corresponding sections on the line 10—10.

A drum is provided consisting of two covers $h^2$ and $h^3$, a cylindrical block portion $h^1$ and a containing shell $h^4$. The cover $h^2$ is keyed or bolted to the crankshaft $j$ and carries a bearing $k^2$ in which one end of the driven shaft $k^1$ is housed. The driven shaft carries adjacent to its housing aforesaid two eccentrics $k^3$ and $k^4$, the other end of the driven shaft is carried in a bearing concentrically through the cover $h^3$. The said bearing is not formed as part of the cover $h^3$ but as the lining of the sliding member $q^1$ contained within the fixed sleeve $t^1$, the latter being secured to a non-rotating part $t^2$ external to the drum and carrying an eccentric $t^3$ within the drum. The part $t^2$ is carried on an outer casing $t^4$ forming an extension of the motor crank case. Between the fixed eccentric $t^3$ and the eccentric of the driven shaft $k^4$ an intermediate bearing $h^6$ is arranged on a bridge or plate $h^5$ bolted to a suitable abutment in the block $h^1$ dividing the said drum virtually into two compartments. In each compartment is a set of six hydraulic cylinders, the one set comprises two groups or sections of three, $m^1$ and $n^1$ respectively and the other consists of a single group $o^1$. In Fig. 3 the $n$ group is omitted, the eccentric $k^4$ being shown bare. These cylinders as drawn are of the oscillating type, being housed in cylindrical seatings or borings $h^7$ in the interior of the block portion of the drum $h^1$. These seatings and the portions of the cylinders bearing on them are furnished with ports $R^1$, $S^1$ and $R^2$ $S^2$ and $m^2$, $n^2$, $o^2$. The hydraulic cylinders are held to their seatings by centrifugal force and by the pressure within them. The hydraulic cylinders of both sets are alike fitted with plungers $m^3$, $n^3$, and $o^3$ which articulate directly to the eccentrics and are retained by floating rings $m^4$, $n^4$ and $o^4$. In the block $h^1$ forming the inner portion of the drum conduits $R^1$, $S^2$ and $s^1$, $s^2$, $r^1$, $r^2$, are drilled and the conduits from the one set of hydraulic gear and from the other set of hydraulic gear are brought together to duplicate pairs of controlling valves $p^1$, $p^1$, $p^1$, $p^1$, in valve casings $h^8$ mounted in the block $h^1$ and arranged to be operated by means hereinafter described.

The type of valve is cylindrical and the four valves $p^1$, $p^1$, $p^1$, $p^1$, are situated respectively at the extremities of two spindles $p^2$. These spindles are arranged transversely, symmetrically one on each side of the main axis of rotation. Pinions $p^3$ are formed on their central portions and the said pinions gear with a common rack block $q^2$ carried by the sliding member $q^1$ co-axial to the drum itself. This rack is mounted on a ball bearing $q^3$ on the inner extremity of the sliding member, being attached to same by the screwed bush $q^4$. Sliding or axial motion is imparted from an external lever $w^1$ conveniently mounted on a floating fulcrum in the eccentric bush $w^2$ and acting through trunnions $w^3$ the said sliding or axial movement being thus under control of the driver. The sleeve $q^1$ passes out between the driven shaft $h^1$ and the tubular fixed shaft $t^1$ surrounding it. Screw caps $h^9$ may be provided to give ready access to the valves.

For the ordinary purposes of automobile propulsion three speeds and a reverse with a free engine position are provided. One of the three speeds is a direct drive. This is obtained by blocking the ports $R^1$ of the $m$ and $n$ groups of cylinders, that is to say the set acting on the driven shaft. The ports $S^1$, also the ports of the $o$ set, being thrown open or vented to the interior of the drum which forms the hydraulic oil reservoir. In addition to the direct drive there is a higher and a lower gear ratio. The former is obtained by coupling the set formed by the $m$ and $n$ groups to the $o$ set in such manner that the output of the latter is delivered to the former. Thus the $m$ $n$ set is driven faster than the drum and the driven shaft correspondingly rotates at a higher speed than the driving shaft. The low gear is obtained conversely by arranging the $o$ set to draw from the $m$ $n$ set, in this case the driven shaft rotates more slowly than the driving shaft, and the torque on the drum and on the driven shaft is augmented by the $o$ set now acting as a motor by the oil forced into it from the $m$ $n$ set. The reverse is obtained by the same disposition of coupling as the low gear, but the ventage is reversed and only one group of three cylinders (the $m$ group) is coupled, the remaining three cylinders (the $n$ group) are vented; under these conditions, the proportions being suitably arranged, the volume of the $o$ set per revolution being greater than the volume of the $m$ group, the $o$ set acts as pump and the $m$ group acts as motor causing the driven shaft to revolve in the reverse direction.

In all cases except the direct drive there are between the $m$ $n$ set and the $o$ set a flow and a return and whichever of these is not carrying pressure is arranged to be vented by the valve system, the vent or vents communicating with the peripheral portion of the drum which constitutes an oil bath, and in which the oil is under substantial pressure due to centrifugal force. An appropriate set of speeds for an automobile road vehicle is given by the foregoing disposition if the volume per revolution of the $o$ set be related to that of the $m$ $n$ set in the ratio of six to ten or thereabout and if the $m$ $n$ set be divided into two numerically equal groups; on reversal the group $n$ being vented and idle, and the group $m$ being functionally operative as hereinbefore described. The two groups $m$ and $n$ may be of identical cylinder capacity but their capacity may differ if required to give any modified reverse gear ratio. Conduits common to the cylinders of each group or set and for the provision of ventage are provided by the grooves $h^{11}$, $h^{12}$, $h^{13}$, $h^{14}$, $h^{15}$, $h^{16}$ turned in the block portion $h^1$ and the shell $h^4$ is shrunk or pressed on to seal the different communication conduits and to render same pressure tight.

Each valve casing $h^8$ is furnished with four ports, arranged as two opposed pairs and situated all in one plane.

The four ports and the drilled passages by which they are served carry the distinguishing letters $s^1$, $r^1$, $s^2$, $r^2$, and these communicate with the annular conduits according to the following plan:—

$s^1$ communicates with $h^{11}$.
$r^1$ " " $h^{13}$.
$s^2$ " " $h^{15}$.
$r^2$ " " $h^{16}$.

All channels and grooves inscribed $v$ are ventages and communicate directly or indirectly with the interior of the drum. Thus the annular passages $h^{12}$ and $h^{14}$ are vented by the drilled passages $v^1$, $v^1$. Each valve is furnished with three ventage ports $v^2$, $v^3$ and $v^4$ (Figs. 9 to 18) communicating permanently with the annular passage $h^{14}$. The valve passages $p^4$ and $p^5$ serve to establish communication between corresponding ports in the valve casing as $s^1$ and $r^1$ or $s^2$ and $r^1$. The valve passage $p^6$ serves to connect the opposed ports $r^1$ and $r^2$.

Since the direction of rotation of the drum under no circumstances undergoes change, the ports of the $o$ set of hydraulic cylinders may be designated by the usual terms inlet and outlet.

The inlet ports $S^2$ in Figs. 4 and 6 communicate by way of the annular channel $h^{15}$ with ports carrying like lettering in Figs. 8 and 9. The outlet ports $R^2$ in Fig. 4 similarly communicate by way of the annular channel $h^{16}$ with ports $r^2$ in Figs. 7 and 10.

Likewise ports S¹ in Fig. 3 communicate with ports S¹ in Figs. 7 and 9 by annular passage $h^{11}$, and R¹ in Figs. 3 and 5 with ports R¹ in Figs. 8 and 10 by way of passage $h^{13}$. Both $m$ and $n$ groups are connected by their R¹ ports to $h^{13}$ whereas the $m$ group only is connected to S¹, the corresponding ports of the $n$ group open to passage $h^{12}$ which is permanently vented by the apertures $v^1$.

The portage diagrams in Figs. 9 to 18 give the valve position and distribution appropriate to conditions as follows:—

Figs. 9 and 10—High gear or "over" gear.
" 11 " 12—Direct drive.
" 13 " 14—Low gear.
" 15 " 16—Free engine.
" 17 " 18—Reverse.

Grooves and holes $v^5$ opening to interior of $h^1$ are provided for the expulsion of air should bubbles become trapped at any time.

The plungers $m^3$, $n^3$ and $o^3$ may be solid or may be bored out to save weight and in order to lubricate the eccentric bearings holes $m^5$, $n^5$ and $o^5$ are drilled axially in the $m^3$, $n^3$ and $o^3$ plungers communicating with the slipper blocks formed by the ends of the plungers bearing on the eccentric surfaces, so that the oil at cylinder pressure is fed direct to the bearing. To facilitate the flow of oil slight flats or grooves $k^5$ and $t^4$ are provided at one or more points on the eccentric or crank pin and these flats or grooves may be conveniently timed to carry the oil pressure about the moment of commutation, that is to say when the plungers are at or near the dead centers.

The holes $m^5$, $n^5$ and $o^5$ may be furnished with non-return valves to prevent the admission of air during the suction strokes as indicated at $n^7$ in Fig. 1 and $m^7$ in Figs. 1 and 3.

Oil distribution grooves $m^6$ and $o^6$ may be provided in the working faces of the slipper blocks. The slipper blocks of the $m$ and $n$ groups extend over a considerable arc of the eccentric surface; the slipper blocks of the $o$ set, on the other hand, require to be relatively crowded, provision having to be made for all six plunger heads on a single eccentric.

It is a characteristic of change gear mechanism constructed as hereinbefore described that the driving element, namely the drum, may come to rest without the driven shaft being stalled, and the mechanism thus has the attributes of a "free wheel" mechanism. This is due to the fact that the hydraulic pressure developed is ordinarily far greater than the maximum negative pressure or vacuum and thus the degree of torque that can be transmitted from the driven element to the driving element is small in comparison with the torque transmitted in the opposite sense.

The present invention is applicable to the transmission of power in machine tools, hoists, cranes and the like.

When, as in the motor car, it is desired to transmit considerable power through a gear box of comparatively small size and weight it is necessary to make use of high pressures, the maximum in a box such as that illustrated may be one ton per square inch or even more. To deal with such pressures satisfactorily it is necessary to employ a high grade of material and accurate workmanship, since the space precludes or renders difficult the use of hydraulic packings. I preferably construct the hydraulic cylinder of steel case hardened with the bore and seating surface accurately ground and lapped. The eccentrics also are case hardened and the plungers, of high grade bronze, accurately ground to a minimum working clearance. The structural parts such as $h^1$, $h^2$, $h^3$, $h^4$, etc., may be made of ordinary steel with a carbon content not less than 0.3 per cent. The spindles $p^2$ are also case hardened and finished by grinding and the valve casings $h^8$ require to be accurately ground or lapped after being pressed home in their housings.

Figs. 1, 2, 3 and 4 of the accompanying drawings, although diagrammatic, correctly represent a working design of gear box so far as concerns the main proportions given.

Having now described my invention, what I claim as new and desire to secure by Letters Patent is:—

1. Clutch and change speed mechanism for the transmission of power comprising a drum or casing forming the driving element provided internally with two sets of radially disposed hydraulic cylinders, whose pistons or plungers engage cranks or eccentrics forming part of, or keyed to, driven and fixed elements respectively, and in means for cross coupling the ports of the two sets of cylinders wholly or partially by valves in such manner as to change the speed and torque ratios of the driving and driven elements as may be required.

2. Clutch and change speed mechanism as claimed in claim 1 in which the radially arranged hydraulic cylinders are of the oscillating type and in which the cylinder trunnion is formed by a cylindrical surface constituting in effect a slide valve by which the portage to the cylinder is controlled.

3. Clutch and change speed mechanism as claimed in claim 1, in which the hydraulic cylinders are arranged in various groups with ports capable of independent control.

4. Clutch and change speed mechanism as claimed in claim 1 in which the hydraulic set coupled to the driven member or shaft is divided into two sections whose portage is independently controlled so that the one section may be functionally operative while the other section is idle for the purpose of securing an additional ratio of drive or a reversal in the direction of rotation.

5. Clutch and change speed mechanism as claimed in claim 1 in which the communication passages between the hydraulic sets take the form of circumferential conduits, and in which the cross coupling is effected by distribution valves, arranged in parallel in such manner that the path of flow is shortened, a multiplicity of paths is provided, and the hydraulic resistance between set and set is diminished.

6. Clutch and change speed mechanism as claimed in claim 1 in which the cross coupling is effected by rotary distribution valves of a close mechanical fit formed as part of, spindles actuated rotationally by means of a part to which a sliding or axial motion is imparted from without, the actuation of the spindles from the sleeve may be effected by rack and pinion mechanism as hereinbefore described, or by any known mechanical equivalent.

7. Clutch and change speed mechanism as claimed in claim 1, in which the hydraulic plungers terminate as slipper blocks bearing directly on pivoted members on the driven and fixed elements respectively and in which provision is made for the lubrication of the pivoted members by holes drilled axially through the plungers and by relief passages or grooves in the crank pin or eccentric surface in the manner described.

8. Clutch and change speed mechanism as claimed in claim 1, in which the hydraulic plungers terminate as slipper blocks bearing directly on eccentrics on the driven and fixed elements respectively, and in which the said slipper blocks are retained in proximity to their bearing surfaces by containing rings in the manner described.

9. Clutch and change speed mechanism as claimed in claim 1, in which the driving element constituting the containing drum comprises a main block or forging furnished with cylinder seatings, portages and valve casings, a surrounding belt or a rigidly fixed drum, in a cover adapted to be bolted to a motor crank shaft or driving shaft, and a second or outer cover axially pierced to make provision for a bearing sleeve carrying a fixed eccentric and a sliding part for the operation of the distribution valves, substantially as hereinbefore described.

In testimony whereof I have signed my name to this specification.

FREDERICK WILLIAM LANCHESTER.